United States Patent [19]
Sprouts

[11] Patent Number: 5,792,252
[45] Date of Patent: Aug. 11, 1998

[54] CEMENT COMPOSITIONS AND ADMIXTURES THEREOF

[75] Inventor: Sandra R. Sprouts, Oakwood Village, Ohio

[73] Assignee: MBT Holding AG, Zurich, Switzerland

[21] Appl. No.: 960,880

[22] Filed: Oct. 30, 1997

Related U.S. Application Data

[63] Continuation of Ser. No. 485,594, Jun. 7, 1995, abandoned.

[51] Int. Cl.$^6$ .............................. C04B 24/04; C04B 24/06
[52] U.S. Cl. .................. 106/728; 106/724; 106/738; 106/810; 106/817; 106/819; 106/823
[58] Field of Search ........................... 106/724, 728, 106/738, 802, 810, 817, 819, 823

[56] References Cited

U.S. PATENT DOCUMENTS

| | | | |
|---|---|---|---|
| 4,160,674 | 7/1979 | Sawyer | 106/89 |
| 4,190,454 | 2/1980 | Yamagisi et al. | 106/90 |
| 4,264,367 | 4/1981 | Schutz | 106/728 |
| 4,640,715 | 2/1987 | Heitzmann, et al. | 106/85 |
| 4,642,137 | 2/1987 | Heitzmann et al. | 106/85 |
| 4,842,649 | 6/1989 | Heitzmann et al. | 106/89 |
| 4,892,586 | 1/1990 | Watanabe et al. | 106/728 |
| 5,536,310 | 7/1996 | Brook et al. | 106/708 |
| 5,556,458 | 9/1996 | Brook et al. | 106/708 |

FOREIGN PATENT DOCUMENTS

| | | |
|---|---|---|
| 54-150432 | 5/1978 | Japan. |
| 54-150433 | 5/1978 | Japan. |
| 2033367 | 5/1980 | United Kingdom. |
| 1575450 | 9/1980 | United Kingdom. |

OTHER PUBLICATIONS

Derwent Abstract: JP 8246420—Concrete prepn. with addn. of citric acid and/or citrate anhydrous gypsum siliceous powder, and water reducing agent, e.g. polyalkylarylsulphonate (Oct. 1983), Denki Kagaku Kogyo KK.

Derwent Abstract: JP 82173978—Cement compsn. for grouting comprises Portland cement, aluminous cement, slaked lime alkali carbonate and carboxylic acid or its salt (Apr. 1984), Mitsuboshi, et al.

Derwent Abstract: JP 78147134—Aluminous cement compsn. contg. water-soluble polyacrylic acid-(salt), and opt. alkali metal carbonate and/or hydroxy-carboxylic acid (Jun. 1980), Denki Kagaku Kogyo Co.

Derwent Abstract: JP 78147135—Aluminous cement with improved high temp. workability—contains polymethacrylic acid or methacrylic acid-acrylic acid copolymer (Jun. 1980), Denki Kagaku Kogyo Co.

*Primary Examiner*—Michael Marcheschi
*Attorney, Agent, or Firm*—Renner, Kenner, Grieve, Bobak, Taylor & Weber

[57] ABSTRACT

Cement admixtures contain an alkali metal carbonate as component (a) and a mono- or di-carboxylate acid or alkali metal salt thereof or an alkali metal salt of a tricarboxylic acid as component (b).

11 Claims, No Drawings

CEMENT COMPOSITIONS AND ADMIXTURES THEREOF

This is a continuation of U.S. application Ser. No. 08/485,594, filed Jun. 7, 1995, now abandoned, which is a continuation of international application PCT/US93/05313, filed Jun. 2, 1993.

FIELD OF THE INVENTION

This invention relates to cementitious compositions and to admixtures for addition thereto.

BACKGROUND OF THE INVENTION

It is desirable to have admixture systems which allow for variations in the properties of workability, initial and final set times and early and final compressive strengths. For example, an objective would be a cementitious composition which remains workable for an extended period (for example, when it must be pumped for a long distance before placement) and then hardens rapidly in place, ideally with the rapid development of good strength. One approach to achieve has involved the utilization of both a traditional accelerator and a retarder in the cementitious composition, whereby, for example, a system is tailored to create a desirable "set time window". However, the achievement of these apparently conflicting requirements along with other desired properties has remained elusive.

DESCRIPTION OF THE INVENTION

It has now been found that it is possible to give to cementitious compositions various desired properties as above indicated, including for example extended workability followed by rapid hardening with rapid acquisition of early strength and an end-product with high ultimate strength. The invention therefore provides an admixture for use in cementitious compositions, which admixture comprises, in a weight ratio of from 1:9–9:1, two components which are (a) an alkali metal carbonate, and (b) a material selected from the group consisting of hydroxy-bearing and non-hydroxy-bearing $C_{1-6}$ mono and dicarboxylic acids and alkali metal salts thereof, and alkali metal salts of hydroxy-bearing tricarboxylic acids.

The invention further provides a hardenable cementitious composition which comprises a hydraulic binder, plus at least 1.0% by weight on hydraulic binder of an admixture as hereinabove described.

The invention further provides a process of providing a cementitious composition which comprises a hydraulic binder with long workability followed by rapid hardening and attainment of early strength, comprising adding to the composition at least 1.0% by weight on hydraulic binder of an admixture as hereinabove described.

The invention further provides use as an admixture in a cementitious composition comprising a hydraulic binder for the purpose of conferring thereon long workability followed by rapid hardening and attainment of early strength, of a combination of alkali metal carbonate and a material selected from the group consisting of $C_{1-6}$ mono- and dicarboxylic acids and salts thereof and alkali metal salts of hydroxy-bearing $C_{1-6}$ tricarboxylic acids, in the weight ratio of from 1:9–9:1, the carbonate and the material together being present to the extent of at least 1.0% by weight of the hydraulic binder.

DETAILED DESCRIPTION OF THE INVENTION

The benefits of this invention are especially surprising in the light of the fact that both components of the admixture are known and have been used individually for some time as admixtures in cementitious compositions. For example, hydroxycarboxylic acids (for example, citric acid) are known retarders and carbonates act as accelerators.

Component (a) may be selected from any alkali metal carbonate known to the art. Bicarbonates may be used but monocarbonates are preferred. Sodium and potassium monocarbonates are the more preferred components (a).

Component (b) may be selected from the carboxy-bearing materials indicated hereinabove. Particularly preferred materials are the hydroxycarboxylic acids falling within the definition of component (b), particularly gluconic, glucolic and malic acids and their alkali metal salts. Non-hydroxy-bearing acids include acetic and propionic acids and their salts, e.g. sodium acetate, as well as the dicarboxylic acids and their salts, for example, malonic acid and its salts. In general, it is particularly preferred that the acid be employed in alkali metal salt form, e.g. sodium and/or potassium salt form. The tricarboxylate is desirably a monohydroxy-bearing tricarboxylate, e.g. a citrate. It is an interesting (and not well understood) phenomenon that tricarboxylic acid alkali metal salts (such as trisodium or tripotassium citrate) will work in this invention, whereas the acids will not. Trisodium and tripotassium citrates and mixtures thereof are among the most preferred components (b).

The reason for the achievement of desirable results by the invention (often superior to anything hitherto available to the art) is not understood but there appears to be a synergism between the two components in the compositions of this invention when used in the appropriate proportions. It appears, without restricting the invention in any way, that the two components of the admixture do not behave in the normal, expected manner—component (b), which includes many materials normally considered as retarders, appears to act as an accelerator, and the carbonate, normally regarded as an accelerator, appears to act as a retarder at least as regards component (b).

The proportions of component (a) to component (b) are 1:9–9:1, more preferably from 1:4–4:1. The more desired combination of properties are obtained at weight ratios of (a) to (b) of from 3:7–6:4, preferably from 55:45–40:60, more preferably 45:55–55:45. In addition, the admixture should be present to the extent of at least 1%, more preferably at least 2%, by weight of hydraulic binder. Desirably, at least 2% by weight of component (b) itself is used, e.g. at least 2% citrate, to provide desirable properties with a variety of cementitious compositions and binder systems.

The admixture is usually added to a cementitious composition at a rate of from 1–15%, preferably from 2–12%, most preferably from 3–10%, particularly 4–10%, by weight solids per cementitious material.

The cementitious compositions of this invention comprise a hydraulic binder, that is, a calcium alumino-silicate-based substance which when mixed with water will set to form a hard product. The more preferred binder is Portland cement but other types of cement such as high alumina cement and slag cement may also be used. When slag cement is employed, it generally represents no more than 50% by weight of the hydraulic binder. The generally preferred binder consists essentially of Portland cement or high alumina cement, or mixtures thereof. Other materials which are not in themselves hydraulic but which can make a contribution to the setting of the final product may be used but are not counted as hydraulic binder. Such materials include the non-hydraulic natural and artificial pozzolans. However, cementitious compositions formed in accord with the invention will be essentially free of materials classed as fly ashes, and particularly Class C type fly ashes.

The components of the admixture may be added to a cementitious composition in any convenient manner. For example, they may be added individually or collectively as solids to a cementitious mix, or the components may be incorporated in the appropriate proportions into a dry cementitious composition which may be stored until needed. Alternatively, the two components may be added as aqueous solutions to a cementitious mix.

In addition to the essential ingredients as hereinabove described, there may also be used other art-recognized ingredients. The most common of these is aggregate, chosen for specific applications (little or no aggregate for grouts, fine aggregate such as sand for mortars, both fine and coarse aggregates for concretes). Most practical cementitious compositions will comprise aggregate, typically to the extent of about 50–90% by weight of the total composition. Known admixtures (as defined in ASTM C 125), for example, plasticizers and superplasticizers such as lignosulfonates, naphthalene sulfonate formaldehyde condensates, sulfonated melamine-formaldehyde condensates and glucoheptonates, may be added in art-recognized quantities.

Other materials which may usefully be added to some compositions according to the invention are silica fume, rice hull ash, precipitated silica and the like. Fibers suitable for use in the construction industry may also be used. Further useful additives include water-soluble polymeric materials such as cellulosic ethers and gums, as well as lattices and similar materials.

The compositions made possible by the present invention include those characterized by an excellent combination of workability time, rapid set, rapid initial strength development and excellent final strength, often exceeding performance levels hitherto known to the art. Compositions having one or more such desired properties but with one or others more or less within normal range may be prepared with the broader teachings of this invention, including the following examples, by varying the amount of components (a) and (b) with increasing amounts of component (a) being used primarily to improve or extend workability time and late strength and component (b) being used to obtain early strength and early set times. Increasing amounts of the combination, e.g. 2% or more, improve flow and early strength characteristics. Moreover, this is achieved by the use of readily-available raw materials and straightforward procedures, making the invention easy to work.

The invention is further described with reference to the following non-limiting examples.

EXAMPLE 1

A mixture of potassium citrate and sodium carbonate (citrate:carbonate ratio 55:45) is added to a concrete mixture consisting of 15.6% type 1 Portland cement and 84.4% aggregate at a rate of 4% citrate and carbonate by weight of the cement. To an identical concrete mixture is added 0.49% by weight of a β-naphthalene sulfonate-formadelhyde-based superplasticizer (RHEOBUILD (trademark) 1000 from Master Builders, Inc. is used). Sufficient water is added to the two mixtures such that the total water is the same in each case, the mixtures are mixed, and they are tested for slump by the slump test of ASTM C 143, for initial set by the Penetration Resistance Test of ASTM C 403 and for final compressive strength by the method of ASTM C 39. The results are as follows—

| Superplasticized Mixture | | Mixture according to the invention |
|---|---|---|
| Slump (in.) at 8 min. | 8.50 | 8.75 |
| Slump (in.) at 28 min. | 6.00 | 9.75 |
| Slump (in.) at 48 min. | 5.00 | 9.25 |
| Slump (in.) at 68 min. | 3.75 | 9.50 |
| Initial set (hr. min.) | 4:52 | 4:30 |
| Compressive Strength (PSI) | | |
| (3 days) | 6485 | 6040 |
| (24 hours) | 5030 | 4430 |
| (6 hours) | 170 | 1090 |

It may be seen that, in the case of the superplasticized mixture, there is a gradual decrease in slump (that is, a gradual decrease in fluidity and consequently of workability). On the other hand, the slump of the mixture according to the invention remains remarkably constant, allowing a much longer working time.

EXAMPLE 2

To illustrate the effect of using hydroxycarboxylate salt and carbonate together, a number of Portland Type I cement pastes are made with the amount (given as by weight on cement) of potassium citrate and sodium carbonate varied as shown in the following table. The figures in the body of the table without brackets are the initial set times and those in the brackets are final set times. The set times are measured in hours and minutes according to the method of ASTM C 266.

| % $Na_2CO_3$ | 3% citrate | 4% citrate | 5% citrate |
|---|---|---|---|
| 1.0 | (a) | (a) (0:27) | (b) (0:15) |
| 2.0 | (a) (1:10) | 0:20 (0:38) | 0:15 (0:30) |
| 3.0 | 1:05 (1:25) | 0:35 (0:50) | 0:25 (0:30) |
| 6.0 | 1:10 (1:30) | 0:50 (1:05) | 0:45 (1:00) |
| 5.0 | 1:10 (1:25) | 1:00 (1:20) | 0:47 (1:05) |

(a) Not measured.

It can clearly be seen that, in each case, times are generally longer with increasing carbonate content and static citrate content, and that times are shorter with increasing citrate content and static carbonate content. This indicates clearly that the citrate is acting as an accelerator and the carbonate is acting as a retarder, a reversal of the normal situation.

EXAMPLE 3

Illustration of the rapid strength development of the compositions of the present invention.

A mortar composition consisting of type III Portland cement (30% by weight) and silica sand (70%) is dosed with 6% by weight on cement of a 55/45 mixture of potassium citrate and sodium carbonate. The water/cement ratio of the mix is 0.26. The mixture is subjected to the following tests:

ASTM C 230—a test for flow. A mixture is added to a circular table and flow is determined with reference to how far the mixture spreads, optionally after the table has been raised and dropped a number of times.

ASTM C 266—setting time by Gillmore needles.

ASTM C 109—compressive strength.

The results are as follows:

| % Flow after 5 drops: | initial | 90 |
|---|---|---|
| | after 30 min. | 60 |
| setting time: | initial | 34 min. |
| | final | 39 min. |
| Compressive strength: | 3 hr. | 3606 |
| | 1 day | 10100 |
| | 7 days | 14125 |

These results indicate a composition which flows well and which maintains this flow (and therefore workability) for an appreciable time, which sets up quickly and which develops good early and final strengths.

EXAMPLE 4

Demonstration of flow retention and early strength development in a mortar.

The mortar is 31% type I Portland cement and 69% silica sand. It is dosed with an admixture according to the following table and water is added to give a water/cement ratio of 0.45. The results are shown in the following table:

| % Admixture (by wt. on cement) | 1 | 3 | 7 | 11 | 13 |
|---|---|---|---|---|---|
| % $Na_2CO_3$ in admixture | 55 | 40 | 55 | 40 | 55 |
| % potassium citrate in admixture | 45 | 60 | 45 | 60 | 45 |
| % flow at 0 drops | | | | | |
| initial* | 81.5 | 145+ | 145+ | 130 | 145+ |
| 30 min.* | 60.5 | 95.0 | 120.5 | 145+ | 145+ |
| Setting time (hr. min.) | | | | | |
| initial | 3:00 | 2:14 | 0:55 | 0:54 | 0:40 |
| final | 4:00 | 3:05 | 1:08 | 1:07 | 0:57 |
| Compressive strength (psi) | | | | | |
| 4 hr. | 245 | 565 | 1368 | 585 | 1000 |
| 1 day | 1326 | 2721 | 4056 | 2635 | 4266 |
| 28 days | 9356 | 10006 | 8506 | 7381 | 8706 |

*the radius of the ASTM C 230 plate is 145 mm. A measurement of 145 or greater represents very good flow.

EXAMPLE 5

An underwater mortar is prepared by blending the following ingredients:

| silica sand | 28.125 parts |
|---|---|
| pea gravel | 39.500 parts |
| BNS superplasticizer | 0.250 parts |
| defoamer | 0.100 parts |
| anti-washout* | 0.075 parts |
| admixture from Example 1 | 1.975 parts |
| type III portland cement | 30.000 parts |

*PS-802 of Master Builders is used.

Water is added to give a water/cement ratio of 0.30 and the following properties are obtained under testing with specimens cut from underwater composite and tested for strength at indicated age:

| % flow at 5 drops (ASTM C 230) | 138 | |
|---|---|---|
| working time | 30 | min. |
| set time | | |
| initial | 45 | min. |
| final | 55 | min. |
| compressive strength (ASTM C 109) | | |
| 2 hours | 1,859 | psi |
| 1 day | 7,364 | psi |
| 28 days | 13,337 | psi |
| underwater | | |
| 2 hours | 934 | psi |
| 1 day | 4,000 | psi |
| 28 days | 8,658 | psi |

EXAMPLE 6

An illustration of the difference between citric acid and potassium citrate.

A composition is prepared by blending 69% by weight of silica sand and 31% of Portland cement. To portions of this mix are added varying quantities of sodium carbonate, citric acid and potassium citrate based on weight of cement. Water is added to these portions at a cement/water ratio of 0.26 and the initial and final set times taken by the method of ASTM C 266. The results are as follows (times (in hours and minutes) without brackets are initial set times, times with brackets are final set times):

| % $Na_2CO_3$ | 5% citric acid | 5% potassium citrate |
|---|---|---|
| 1.0 | 7:18 (11:48) | 0:05 (0:08) |
| 5.0 | 0:10 (0:15) | 0:22 (0:32) |

The difference can be clearly seen; in the case of the citric acid, an increase in sodium carbonate produces a notable acceleration of hardening, whereas, in the case of the potassium citrate, an identical increase produces a retardation of hardening.

EXAMPLE 7

A) Use of sodium acetate paste (100 parts portland cement to 35 parts water)

added: 2.75 parts sodium acetate and 2.25 parts sodium carbonate initial set: 24 min. final set: 30 min.

B) Use of potassium glycolate paste as above added: 2.75 parts glycolic acid and 2.25 parts sodium carbonate initial set: 158 min. final set: 248 min.

The above formulations develop good early and late strength properties.

I claim:

1. A process of producing a cementitious composition that is essentially free of fly ash and has a set time which is initially retarded for extended workability followed by accelerated hardening, comprising adding to a cementitious composition an admixture, said admixture consisting essentially of the combination of (a) an alkali metal carbonate, and (b) one or more materials selected from the group consisting of alkali metal salts of $C_1$–$C_6$ hydroxy-bearing tricarboxylic acids, in a weight ratio of (a) to (b) of from 1:9 to 9:1, said cementitious composition comprising a hydraulic binder wherein said hydraulic binder consists essentially of portland cement, provided (b) is added to the cementitious composition in an amount of at least 2% by weight based on the weight of the portland cement.

2. A process according to claim 1, wherein the weight ratio of (a) to (b) is in the range of 3:7 to 6:4.

3. A process according to claim 1, wherein the weight ratio of (a) to (b) is in the range of 55:45 to 40:60.

4. A process according to claim 1, wherein the alkali metal salts of hydroxy-bearing tricarboxylic acids are trisodium or tripotassium citrate or mixtures thereof.

5. A process according to claim 1, wherein the alkali metal carbonate is sodium or potassium carbonate.

6. A hardenable cementitious composition that is essentially free of fly ash comprising a hydraulic binder and an admixture, the admixture consisting essentially of, in combination, (a) an alkali metal carbonate, and (b) one or more materials selected from the group consisting of alkali metal salts of hydroxy bearing $C_1$–$C_6$ tricarboxylic acids, in a weight ratio of (a) to (b) of from 1:9 to 9:1, said hydraulic binder consisting essentially of portland cement, and (b) being present in an amount of at least 2% by weight based on the weight of the portland cement.

7. A hardenable composition according to claim 6, wherein the weight ratio of (a) to (b) is in the range of 3:7 to 6:4.

8. A hardenable composition according to claim 6, wherein the weight ratio of (a) to (b) is in the range of 55:45 to 40:60.

9. A hardenable composition according to claim 6, wherein the alkali metal salts of hydroxy-bearing tricarboxylic acids are trisodium or tripotassium citrate or mixtures thereof.

10. A hardenable composition according to claim 6, wherein the alkali metal carbonate is sodium or potassium carbonate.

11. A hardenable composition according to claim 6, wherein said admixture is present in an amount of 3–10% by weight based on the weight of the portland cement.

* * * * *